United States Patent [19]

Powrie et al.

[11] 4,097,612

[45] Jun. 27, 1978

[54] POTATO TREATMENT PROCESS

[75] Inventors: William Duncan Powrie; Marvin Tung, both of Vancouver, Canada

[73] Assignee: Creston Valley Foods Ltd., Vancouver, Canada

[21] Appl. No.: 667,460

[22] Filed: Mar. 16, 1976

Related U.S. Application Data

[63] Continuation-in-part of Ser. No. 531,166, Dec. 9, 1974, abandoned.

[30] Foreign Application Priority Data

May 10, 1974 Canada .................................. 199477

[51] Int. Cl.$^2$ ............................................. A23L 1/216
[52] U.S. Cl. ................................... 426/269; 426/262; 426/268; 426/271; 426/325
[58] Field of Search ............... 426/269, 268, 267, 263, 426/262, 412, 270, 324, 325, 321, 637, 271

[56] References Cited

U.S. PATENT DOCUMENTS

| | | | |
|---|---|---|---|
| 2,475,838 | 7/1949 | Johnson | 426/269 |
| 2,506,793 | 9/1950 | Kalmar et al. | 426/262 |
| 2,589,591 | 3/1952 | Xander | 426/268 |
| 2,620,277 | 12/1952 | Scalera | 426/269 |
| 2,816,037 | 12/1957 | Olson et al. | 426/268 |
| 2,893,878 | 7/1959 | Simon et al. | 426/267 |
| 3,305,366 | 2/1967 | Sutton et al. | 426/262 |
| 3,574,643 | 4/1971 | Lewis | 426/637 |
| 3,594,187 | 7/1971 | Liepa | 426/637 |
| 3,634,095 | 1/1972 | Williard | 426/808 |
| 3,634,105 | 1/1972 | Beck | 426/637 |

FOREIGN PATENT DOCUMENTS

| | | | |
|---|---|---|---|
| 2,019,379 | 11/1971 | Germany | 426/412 |
| 1,245,471 | 9/1971 | United Kingdom | 426/412 |
| 1,204,092 | 9/1970 | United Kingdom | 426/412 |

OTHER PUBLICATIONS

Potato Processing, Avi Publ. Co., 1967, Talburt et al.
HNBK of Food Additives, 1968, Chemical Rubber Co., Furia.

*Primary Examiner*—Steven L. Weinstein
*Attorney, Agent, or Firm*—Larson, Taylor and Hinds

[57] ABSTRACT

This invention relates to the treatment of raw white potatoes previously stored at low temperatures (about 40° to 45° F for periods up to 10 months) to render them suitable for thermal sterilization at about 250° F and for long-term storage in flexible plastic or plastic-aluminum foil laminated containers such as pouches without added liquid. The process comprises; (a) immersion of potatoes, either whole, sliced, diced or in any other convenient form, in an aqueous solution comprising citrate in combination with sulfur dioxide; followed by (b) immersion in an aqueous solution of an alkali metal pyrophosphate and optionally a reducing saccharide; followed by (c) immersion in an aqueous solution of an alkaline earth metal salt and optionally an alkali metal chloride. The so-treated potato product is then packaged in a flexible container and thermally sterilized. Use of this process not only is effective for retaining potato whiteness, but improves tissue elasticity and integrity, and prevents the development of an earthy off-odor.

16 Claims, No Drawings

4,097,612

POTATO TREATMENT PROCESS

BACKGROUND OF THE INVENTION

This application is a continuation-in-part of our earlier co-pending application Ser. No. 531,166, filed Dec. 9, 1974, and now abandoned.

The invention relates to a process for the treatment of raw white potatoes previously stored at low temperatures to render them suitable for sterilization at about 250° F and for long-term storage in flexible plastic or plastic-aluminum foil laminated containers without added liquid.

The conventional method of preserving vegetables in rigid containers such as tinplated cans suffer from the disadvantages that some constituents in the tissure are leached out into the added brine solution with the result of excessive tissue softening and nutrient loss, and that the product is tainted by a tin-can flavour.

There has more recently been a movement towards the use of flexible plastic containers in the preservation of vegetables because of some of the following advantages: no need to add a liquid as a heat transfer medium, no carry-over flavour from the container; a shorter processing time; and containers are light weight, easy-to-open, and easy-to-dispose-of. Raw potatoes previously stored at low temperatures (normally 40° to 45° F) become brownish-grey and develop an earthy off-odour when they are sterilized at about 250° F. As the storage period of the raw potatoes at these low temperature is increased, the degree of discoloration and of earthy off-odour of the sterilized potatoes increases. Presumably the reactants, involved in the discoloration and development of off-odour are formed during the low-temperature storage period.

Other types of discoloration of potato tissue have been reported but an earthy off-odour development does not accompany these colour reactions. Such discolorations includes enzymic alteration of tyrosine in peeled raw potatoes, Maillard reaction in dehydrated potatoes, and interaction of ferric ions with orthodiphenolic compounds in potatoes boiled in water.

Losses of tissue integrity and firmness have been also observed in thermally sterilized potatoes previously stored in the raw state at low temperatures. Presumably the cementing pectic substances in the middle lamella are decomposed during potato storage and thus the tissue softens extensively and fissures may be formed during heat sterilization.

OBJECTIVES OF THE INVENTION

The primary objective of this present invention is to provide a treatment for raw potatoes, previously stored at about 40° to 45° F, and possibly thereafter conditioned in known manner at about room temperature, so that discoloration and earthy off-odour are greatly reduced or do not appear at all during subsequent heat sterilization of the product in flexible plastic or plastic-aluminum foil laminated containers without added liquid.

Another objective of this present invention is to improve the elasticity, firmness and integrity of the sterilized potatoes. The elasticity of the potato tissue is essential to restrict physical damage such as tissue fissuring and tissue distortion brought about during product handling and transportation.

Another objective of this present invention is to reduce the tendency of sterilized potato pieces to stick together.

SUMMARY OF THE INVENTION

The present invention provides a process for the treatment of raw, low temperature-stored potatoes, to improve their quality for thermal sterilization and long-term storage in flexible plastic or plastic-aluminum foil laminated containers without added fluid. The potatoes may be treated whole or sliced, e.g. diced or in any other convenient form, depending on how it is desired to package them. The sterilized potato product, which may be either heated in the flexible container or removed from the container for frying, possesses excellent potato flavour, desirable textural characteristics and white internal tissue.

The particular treatment process of this invention comprises the following three sequential blanching steps, with the option of water rinsing between the blanches: (a) immersion of the potatoes, either whole or sliced, in an aqueous solution of citric acid and/or sodium or potassium citrate in combination with sulfur dioxide in free form or in the form of sodium or potassium sulfite, bisulfite and/or metabisulfite, followed by (b) immersion in an aqueous solution of sodium or potassium pyrophosphate and optionally a reducing saccharide; followed by (c) immersion in an aqueous solution of one or more non-toxic alkaline earth metal salts and optionally sodium and/or potassium chloride.

There need be no pause between the three blanching steps, the food product for instance being dipped into one aqueous solution after another, preferably being washed with a spray of water between dips to reduce contamination of the next solution.

DESCRIPTION OF THE PREFERRED EMBODIMENTS

The first blanch, i.e. blanch (a) of the process of this invention is carried out using an aqueous solution at a temperature of about 190° F for 1 minute to about 110° F for 5 minutes. The solution is adjusted to a pH between 2.3 and 6.5, preferably in the range between 4.4 and 6.5 for optimum effectiveness. The aqueous solution is composed of citric acid and/or alkali metal salts of citric acid at a concentration from 0.2 to 4% by weight (as citric acid) in combination with sulfur dioxide, preferably 0.005 to 0.8% by weight, this sulfur dioxide being added to the aqueous solution in the form of a gas, an alkali metal sulfite, bisulfite and/or metabisulfite.

Sulfur dioxide and/or its salts alone can be used to control the brown-grey discoloration and earthy off-odour of potatoes but at the concentration level necessary for such control, a sulfur dioxide-like odour is apparent in the sterilized product. Citric acid and/or alkali metal salts of citric acid have been found to have a synergistic effect on the sulfur dioxide and/or its salts. Thus the effective concentration level of sulfur dioxide and/or its salts can be lowered when citric acid and/or its salts are added to the first blanch solution for controlling discoloration and earthy off-odour. As a consequence, it becomes possible to avoid the sulfur dioxide-like odour in the sterilized potato product.

At the first blanch temperature of between 110° and 190° F, it is believed that pectin methyl esterase is activated in the middle lamellae and demethylates the pectic substances in the potatoes to form carboxyl groups. These groups are required for interaction with the alkaline earth metal ions introduced into the potatoes during step (c) so that the elasticity and integrity of potato tissue can be improved. Within the range of the first blanching temperatures, tissue gas is removed and cell walls are altered to enhance the diffusion of additives into the cell interiors.

Blanch (b) is carried out by immersing potatoes resulting from blanch (a) in an aqueous solution of sodium of potassium pyrophosphate (at a concentration of 0.5 to 1.5%, by weight) and optionally a reducing saccharide (0.5 to 2.5%, by weight) at a temperature of about 212° F for 15 seconds to about 140° F for 60 seconds e.g. 180° F for 20 seconds. Preferred pyrophosphates used in step (b) are sodium acid pyrophosphate ($Na_2H_2P_2O_7$) and potassium acid pyrophosphate ($K_2H_2P_2O_7$). The pyrophosphate is used to aid in improving the texture and inhibiting the greying of the sterilized potato tissue. The pyrophosphate, a complexing agent, is introduced into potato tissue at this stage of processing so that the alkaline earth metal ions from solution (c) are held as metal complexes.

We believe that during thermal sterilization of potatoes, the complexes may be broken down for a controlled release of the alkaline earth metal ions. These ions may interact with carboxyl groups of pectic substances in the heat-disrupted middle lamellae (disrupted markedly during sterilization) for the cross-linking to strengthen the potato tissue.

Greying of potato tissue during thermal sterilization and storage in the pouch may be inhibited by pyrophosphates. The mechanism of greying is not known.

Step (b) may also serve to introduce reducing saccharides into the potato tissue to enhance the non-enzymic Maillard reaction which is of importance if the product is subsequently fried (e.g., french fried potatoes, hash browns) and has only a very low natural sugar content. The preferred reducing saccharide is glucose. If the stored potato has a relatively high reducing sugar content, no reducing sugar is included in step (b). If the natural reducing sugar content of the potato is very high or very low, longer treatment times within the above range are preferred, to help the sugar concentrations to approach equilibrium.

After step (b), the potatoes are subjected to step (c) by immersion of the potatoes in an aqueous solution of one or more non-toxic alkaline earth metal salts, such as calcium or magnesium salts, alone or in combination with sodium and/or potassium chloride. The immersion in the aqueous solution of step (c) is carried out at about 212° F for 15 seconds to about 140° F for 60 seconds, e.g. 180° F for 30 seconds. The pH need not be adjusted but generally will be on the acid side of neutrality. The concentration of the alkaline earth metal salt should be from 0.05 to 0.5% by weight, and that of the sodium and/or potassium chloride from 0 to 8%, particularly 0.5 to 8%, by weight. The alkaline earth metal ions such as calcium and magnesium are introduced into the tissue to ultimately interact with pectic substances during sterilization to increase tissue firmness and elasticity. After infusion of these ions into potato tissue at step (c) they are complexed with pyrophosphate. The sodium and/or potassium chloride is introduced to provide a salty taste and accentuate the natural potato flavour. Potassium chloride and the other potassium salts referred to herein are useful in cases wherein the intake of sodium must be restricted.

Prior to sealing the potato-filled container, air must be removed by some type of vacuum system to reduce autoxidation of compounds such as ascrobic acid. If the pressure in the containers is reduced to about 2 to 7 inches of Hg, and the containers sealed and sterilized, potato pieces adhere strongly to each other and must be separated by hand. Presumably amylose, a component of potato starch, acts as an adhesive when it migrates from the starch granules during heat sterilization. With pressure on the walls of the containers during sterilization, the potato pieces would be pressed together to enhance adhesive bonding.

Two methods can be used to aid in minimizing the potato piece-to-piece adhesion during sterilization. In the first method, one or more amylosecomplexing agents and a surfactant are added to solution (c) or are used as a separate treating solution following step (c). About 0.05 to 1% by weight of a higher fatty acid salt such as sodium palmitate, a polyoxyethylene higher fatty acid (an adduct of ethylene oxide with a higher fatty acid) and/or a monoglyceride and about 0.05 to 1% by weight of a non-toxic surfactant such as polyoxyethylene sorbitan fatty acid ester, are suitable. The surfactant tends to lower the surface tension.

The other method of inhibiting adhesion, which is the preferred method, is the back flush technique. The potato-filled container is evacuated to a pressure of about 2 inches of Hg, an inert gas such as nitrogen is then introduced until the pressure rises to 12 to 28 inches of Hg, preferably to between 12 and 16 inches of Hg. The container is then sealed, normally by heat sealing. Presumably the gas under these conditions is physically adsorbed onto the potato surfaces and restricts adhesion of potato pieces even though an air overpressure of up to 15 p.s.i.g. is imposed on the container during sterilization and cooling. A combination of the two methods may also be used to prevent adhesion.

The treated potato pieces may be oriented in a particular manner or placed randomly in the flexible container. The material used for the flexible container should be impervious to bacteria and microorganisms, should be heat-stable and non-toxic. Particularly suitable materials are laminates of various plastic polymer films and aluminum foil, such as nylon/polyolefin, nylon/polyethylene, nylon/aluminum foil/polyethylene, polyester/polyolefin, polyester/aluminum foil/polyolefin and nylon/aluminum foil/polyolefin. Containers made of these materials may be noticed to facilitate ease of opening.

It is preferred to effect thermal sterilization at a temperature between about 230° to 250° F, while subjecting the thermally-sealed container to a retort over-pressure exceeding the internal pressur of the flexible container by up to 15 p.s.i.g. In the sterilization process, the flexible containers are placed on perforated retort racks which ensure that the containers (positioned horizontally) remain separated, and permitting circulation of the steam heating medium. The over-pressure of up to 15 p.s.i.g. is required until the product has cooled sufficiently to prevent bursting of the containers by internal water vapour and gas pressure. It is preferred to use compressed air to bring about this over-pressure.

The sterility of the potato product prepared in this manner is assured by adequate thermal sterilization conditions and is maintained by the container material which should also be impervious to oxygen and water vapour. The flexible container is moreover advantageous from the standpoint of each of handling, transportation, and storage.

The process of this invention is illustrated in detail by the following non-limiting example.

EXAMPLE

Potato french-fry slices are immersed in (a) an aqueous solution of 0.15% sodium metabisulfite, 2.33% sodium citrate and 0.23% citric acid (pH 5.8 measured at 77° F). The slices are held in this solution at 190° F for 1 minute. Next, the potatoes are immersed in (b) an aqueous solution consisting of 1% glucose and 1% sodium acid pyrophosphate at 180° F for 20 seconds. Finally the potatoes are immersed in (c) an aqueous solution containing 0.2% calcium chloride and 6% sodium chloride at 180° F for 30 seconds.

The potatoes are placed in polyester/aluminum foil/polyolefin laminated pouches (about one pound per pouch). The pouches are evacuated to a pressure of about 2 inches of Hg and back flushed with nitrogen to a pressure of 15 inches of Hg and sealed. The pouches are retorted at 250° F for 45 minutes with an air over-pressure of about 15 p.s.i.g.

Generally similar, even if not quite such satisfactory results, are obtained if instead of using the nitrogen back flushing technique, solution (c) includes e.g. 0.2% sodium palmitate, polyoxyethylene stearic acid or monoolein together with 0.8% polyoxyethylene sorbitan palmitate, or a separate solution containing these wetting and complexing agents is used to treat the potato following step (c).

The sterilized potato product when fried in vegetable shortening at 375° F, has a uniform golden brown surface crust, a firm texture, a white interior and a desirable potato flavour.

What we claim as our invention is:

1. A process for treatment of raw white potatoes, which have previously been stored at temperatures of about 40° to 45° F, to improve their quality for subsequent thermal sterilization and storage in flexible containers without added liquid, which comprises immersing said stored potatoes, after they have been peeled, in whole or divided form, successively in:
   (a) an aqueous solution containing
      (1) 0.2 to 4% by weight of citric acid or sodium or potassium citrate, and
      (2) 0.005 to 0.8% by weight of sulfur dioxide in free form or in the form of sodium or potassium sulfite, bisulfite or metabisulfite; said aqueous solution having a pH of 2.3 to 6.5, the immersion of the potatoes in said solution (a) being from about 1 minute at 190° F to 5 minutes at 110° F;
   (b) an aqueous solution containing sodium or potassium pyrophosphate in a concentration of 0.5 to 1.5% by weight, the immersion of the potatoes in said solution (b) being from 15 seconds at 212° F to 60 seconds at 140° F; and
   (c) an aqueous solution of a non-toxic alkaline earth metal salt in a concentration of 0.05 to 0.5% by weight, the immersion of the potatoes in said solution (c) being from 15 seconds at 212° F to 60 seconds at 140° F. and thereafter sealing the peeled potatoes, without added liquid, in a flexible storage container and subjecting the peeled potatoes in the flexible container to thermal sterilization.

2. A process as claimed in claim 1 wherein the sterilizing is carried out at a temperature between about 230° and 250° F, while subjecting the sealed container to an over-pressure exceeding the internal pressure of the flexible container by up to 15 p.s.i.g., such over-pressure being maintained until the containers have cooled following the termination of the sterilization.

3. A process as claimed in claim 1 wherein the container, prior to sealing, is evacuated to a pressure of about 2 in. Hg, nitrogen is introduced until the pressure rises to between 12 and 16 in. Hg, and thereafter the container is sealed.

4. A process as claimed in claim 1 wherein the container is made from a laminate selected from nylon/polyolefin, nylon/polyethylene, nylon/aluminum foil/polyethylene, polyester/polyolefin, polyester/aluminum foil/polyolefin and nylon/aluminum foil/polyolefin.

5. A process as claimed in claim 1 comprising the further steps, after the potatoes are placed in said flexible storage container, of replacing air in said container with nitrogen, and sealing the container under a subatmospheric pressure, and wherein said thermal sterilization is effected under pressure.

6. A process as claimed in claim 1 wherein said aqueous solution (c) includes sodium or potassium chloride in a concentration of 0.5 to 8% by weight.

7. A process as claimed in claim 6 wherein the potatoes are whole.

8. A process as claimed in claim 1 wherein the aqueous solution (b) is a solution of sodium acid pyrophosphate or potassium acid pyrophosphate.

9. A process as claimed in claim 8 wherein said aqueous solution includes glucose in a concentration of 0.5 to 2.5% by weight.

10. A process as claimed in claim 1 wherein said aqueous solution (c) is an aqueous solution of calcium chloride.

11. A process as claimed in claim 10 wherein said aqueous solution includes sodium chloride in a concentration of 0.5 to 8% by weight.

12. A process as claimed in claim 1 wherein said aqueous solution (b) includes a reducing polysaccharide in a concentration of 0.5 to 25% by weight.

13. A process as claimed in claim 12 wherein said aqueous solution (c) includes sodium or potassium chloride in a concentration of 0.5 to 8% by weight.

14. A process as claimed in claim 13 wherein the potatoes are sliced.

15. A process as claimed in claim 14 wherein solution (c) contains additionally a non-toxic amylose complexing agent and a non-toxic surfactant.

16. A process as claimed in claim 14 which includes the additional step of treating the sliced potato, following the immersion of the potatoes in solution (c), with a solution containing a non-toxic amylose complexing agent and a non-toxic surfactant.

* * * * *